US010969718B2

(12) United States Patent
Watatani et al.

(10) Patent No.: US 10,969,718 B2
(45) Date of Patent: Apr. 6, 2021

(54) FIXING DEVICE INCLUDING ROTOR FACING INNER CIRCUMFERENTIAL SURFACE OF FIXING BELT AND IMAGE FORMING APPARATUS

(71) Applicant: KYOCERA Document Solutions Inc., Osaka (JP)

(72) Inventors: Tomohiro Watatani, Osaka (JP); Masakazu Uehara, Osaka (JP); Hironori Takahashi, Osaka (JP); Yuhiro Sakai, Osaka (JP); Fumito Nakamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/887,275

(22) Filed: May 29, 2020

(65) Prior Publication Data

US 2020/0379387 A1    Dec. 3, 2020

(30) Foreign Application Priority Data

May 31, 2019   (JP) .............................. JP2019-102279

(51) Int. Cl.
*G03G 15/20* (2006.01)
*B65G 39/14* (2006.01)

(52) U.S. Cl.
CPC ......... *G03G 15/2053* (2013.01); *B65G 39/14* (2013.01); *G03G 15/2064* (2013.01); *G03G 2215/2035* (2013.01); *G03G 2215/2038* (2013.01)

(58) Field of Classification Search
CPC .......... G03G 15/2053; G03G 15/2064; G03G 15/2017; G03G 2215/3035; G03G 2215/2038; B65G 39/14
See application file for complete search history.

(56) References Cited

U.S. PATENT DOCUMENTS

| 2,277,402 | A | * | 3/1942 | Hocek | .................... B65G 39/14 198/824 |
| 6,181,908 | B1 | * | 1/2001 | Leemhuis | .............. B65H 29/70 271/188 |
| 10,429,782 | B2 | | 10/2019 | Honke et al. | |
| 2008/0240807 | A1 | * | 10/2008 | Lee | .................... G03G 15/2064 399/329 |
| 2016/0098001 | A1 | * | 4/2016 | Ogawa | ............... G03G 15/2053 399/338 |
| 2018/0203390 | A1 | | 7/2018 | Honke et al. | |

FOREIGN PATENT DOCUMENTS

JP          2018-112689 A       7/2018

* cited by examiner

Primary Examiner — Walter L Lindsay, Jr.
Assistant Examiner — Laura Roth
(74) Attorney, Agent, or Firm — Studebaker & Brackett PC

(57) ABSTRACT

A fixing device includes a fixing belt and a heating section. The heating section faces an inner circumferential surface of the fixing belt. The heating section includes a heater, a heater holding member, a reinforcing member, and at least one rotor. The heater heats the fixing belt. The heater holding member holds the heater. The reinforcing member reinforces the heater holding member. The at least one rotor faces the inner circumferential surface of the fixing belt. The at least one rotor is attached to the reinforcing member.

5 Claims, 6 Drawing Sheets

FIXING DEVICE INCLUDING ROTOR FACING INNER CIRCUMFERENTIAL SURFACE OF FIXING BELT AND IMAGE FORMING APPARATUS

INCORPORATION BY REFERENCE

The present application claims priority under 35 U.S.C. § 119 to Japanese Patent Application No. 2019-102279, filed on May 31, 2019. The contents of this application are incorporated herein by reference in their entirety.

BACKGROUND

The present disclosure relates to a fixing device and an image forming apparatus.

An electrographic image forming apparatus includes a fixing device that fixes a toner image to paper. A fixing device includes a film, a heater, a guide member, a frame stay, a flange, and a pressure roller.

The film is flexible and has an endless shape. The heater is a heating conductor. The guide member holds the heater and guides rotation of the film. The frame stay holds the guide member. The flange receives ends of the film in a longitudinal direction thereof and prevents deflection of the film. The pressure roller drives to rotate the film while, together with the film, forming a nip part.

SUMMARY

A fixing device according to an aspect of the present disclosure includes a fixing belt and a heating section. The heating section faces an inner circumferential surface of the fixing belt. The heating section includes a heater, a heater holding member, a reinforcing member, and at least one rotor. The heater heats the fixing belt. The heater holding member holds the heater. The reinforcing member reinforces the heater holding member. The at least one rotor faces the inner circumferential surface. The at least one rotor is attached to the reinforcing member.

An image forming apparatus according to an aspect of the present disclosure includes the above-described fixing device and an image forming section. The image forming section forms a toner image on a recording medium. The fixing device fixes the toner image to the recording medium.

DETAILED DESCRIPTION

Figure 1:
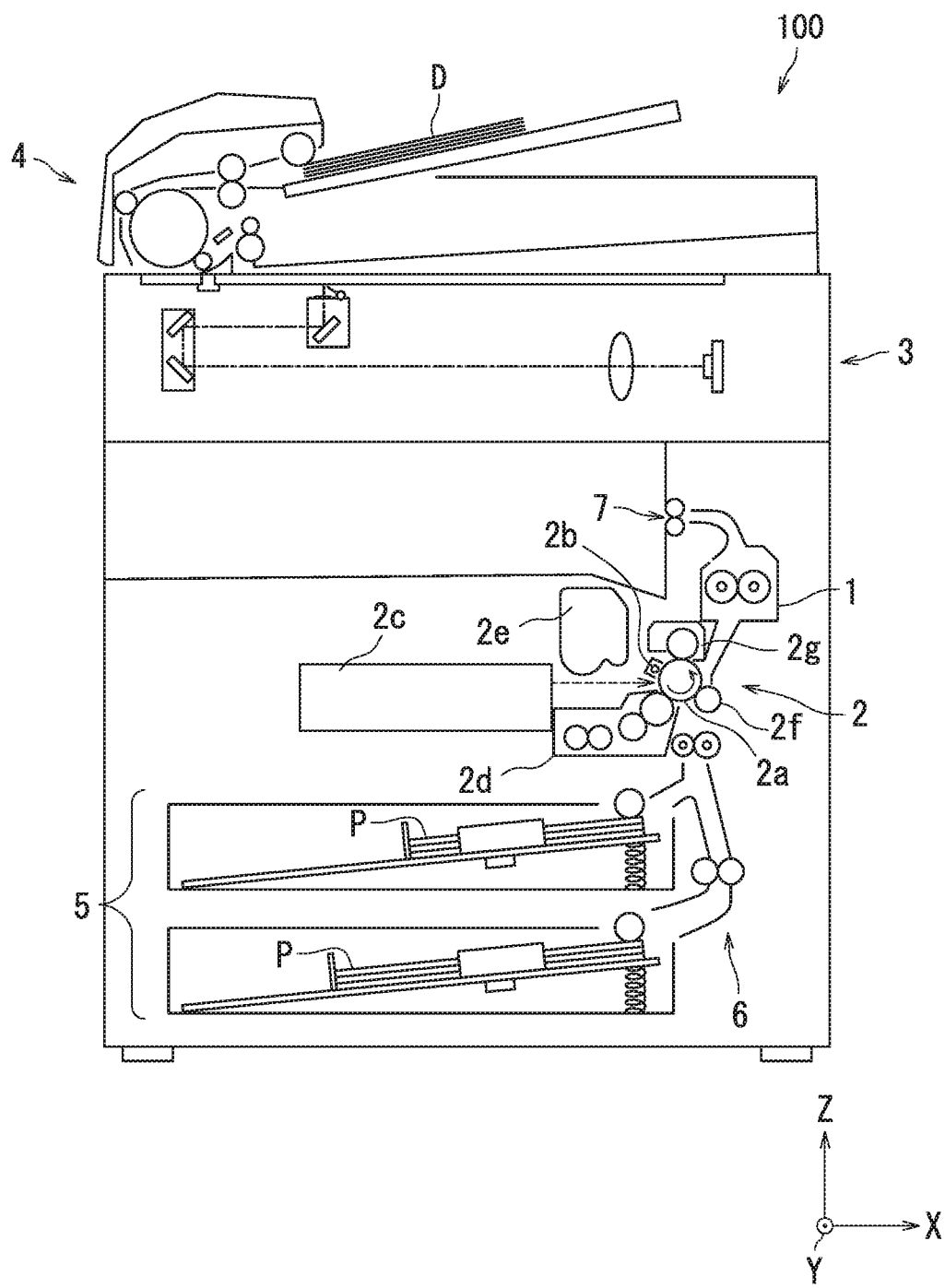
FIG. 1 illustrates an image forming apparatus according to an embodiment of the present disclosure.

An embodiment of the present disclosure will hereinafter be described with reference to the accompanying drawings. Elements that are the same or equivalent are labelled with the same reference signs in the drawings and description thereof is not repeated. In addition, mutually perpendicular X, Y, and Z axes are depicted in the drawings. The Z axis is parallel to a vertical plane, while the X and Y axes are parallel to a horizontal plane.

An image forming apparatus 100 according to the embodiment of the present disclosure will be described with reference to FIG. 1. FIG. 1 illustrates the image forming apparatus 100 according to the present embodiment. Examples of the image forming apparatus 100 include a copier, a facsimile machine, and a multifunction peripheral with functions of these machines. In the present embodiment, the image forming apparatus 100 is a monochrome multifunction peripheral.

As illustrated in FIG. 1, the image forming apparatus 100 includes a fixing device 1, an image forming section 2, a reading section 3, a document conveyance section 4, a paper feed section 5, a conveyance section 6, and an ejection section 7.

The reading section 3 reads an image of a document D. The document conveyance section 4 conveys the document D to a predetermined reading location. The reading section 3 reads an image of the document D passing through the predetermined reading location. The paper feed section 5 accommodates pieces of paper P and feeds the paper P to the conveyance section 6 one piece at a time. The paper P is one example of a recording medium. For example, the recording medium is made from synthetic resin or paper. The conveyance section 6 includes conveyance roller pairs and conveys the paper P to the ejection section 7 via the image forming section 2.

The image forming section 2 electrographically forms a toner image on the paper P based on image data. The image data represents for example the image of the document D. The image forming section 2 includes for example a photosensitive drum 2a, a charger 2b, a light exposure device 2c, a development device 2d, a replenishment device 2e, a transfer roller 2f, and a cleaning device 2g. The image forming section 2 further includes a static elimination device.

The fixing device 1 applies heat and pressure to the toner image to fix the toner image to the paper P. The conveyance section 6 conveys, to the ejection section 7, the paper P to which the toner image has been fixed. The ejection section 7 ejects the paper P out of a housing of the image forming apparatus 100.

Figure 2:
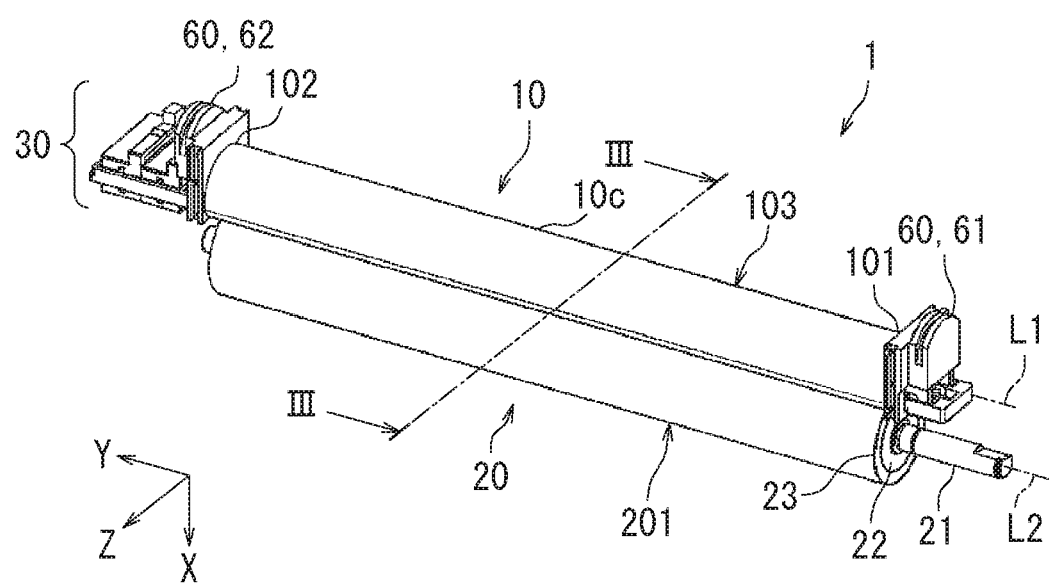
FIG. 2 is a perspective view of main parts of a fixing device according to the embodiment of the present disclosure.

A configuration of the fixing device 1 according to the present embodiment will next be described in detail with reference to FIGS. 2 and 3. FIG. 2 is a perspective view of main parts of the fixing device 1 according to the present embodiment.

As illustrated in FIG. 2, the fixing device 1 includes a fixing belt 10, a pressure member 20, a heating section 30, and a belt holding member 60.

The fixing belt 10 heats the paper P to which the toner image has been transferred. The fixing belt 10 has an endless shape. The fixing belt 10 is substantially hollow cylindrical in shape. The fixing belt 10 is flexible. The fixing belt 10 is allowed to rotate on a first rotational axis L1 as an axial center. The fixing belt 10 extends in a direction of a first rotational axis L1. The fixing belt 10 includes a first end 101, a second end 102, and a central portion 10c. In addition, the fixing belt 10 has an outer circumferential surface 103. The first and second ends 101 and 102 are opposite ends of the fixing belt 10 in the direction of the first rotational axis L1. The central portion 10c is a central portion of the fixing belt 10 in the direction of the first rotational axis L1. The direction of the first rotational axis L1 may hereinafter be referred to as a "width direction of the fixing belt 10".

The fixing belt 10 includes layers. The fixing belt 10 includes for example a polyimide layer and a releasing layer. The releasing layer is formed around an outer circumferential surface of the polyimide layer. The releasing layer is for example a heat resistant film made from fluororesin.

The pressure member 20, together with the fixing belt 10, applies pressure to the paper P to which the toner image has been transferred. The pressure member 20 is substantially columnar in shape. The pressure member 20 is placed facing the fixing belt 10. The pressure member 20 has an outer circumferential surface 201. The outer circumferential surface 201 of the pressure member 20 is in contact with the outer circumferential surface 103 of the fixing belt 10. Specifically, the pressure member 20 presses the fixing belt 10. A fixing nip is consequently formed.

The pressure member 20 is allowed to rotate on a second rotational axis L2 as an axial center. When the pressure member 20 is rotating, the fixing belt 10 rotates following the pressure member 20 being rotating. In other words, the pressure member 20 rotates the fixing belt 10.

The toner image is fixed to the paper P as a result of the paper P passing through the fixing nip. The paper P is conveyed in a paper conveyance direction (to a positive side of the Z axis). The pressure member 20 is for example a pressure roller. The pressure member 20 extends along the second rotational axis L2. Note that the second rotational axis L2 is substantially parallel to the first rotational axis L1.

The pressure member 20 includes a metal core 21 that is columnar, an elastic layer 22 that is hollow cylindrical, and a releasing layer 23. The elastic layer 22 is formed around the metal core 21. The releasing layer 23 is formed to cover a surface of the elastic layer 22. The metal core 21 is allowed to rotate on the second rotational axis L2 as the axial center. The metal core 21 is made from for example stainless steel or aluminum. The elastic layer 22 has elasticity and is made from for example silicone rubber. The releasing layer 23 is made from for example fluororesin.

The belt holding member 60 holds the ends of the fixing belt 10. The belt holding member 60 includes a first holding member 61 and a second holding member 62. The first holding member 61 holds the first end 101 of the fixing belt 10. The second holding member 62 holds the second end 102 of the fixing belt 10.

Figure 3:
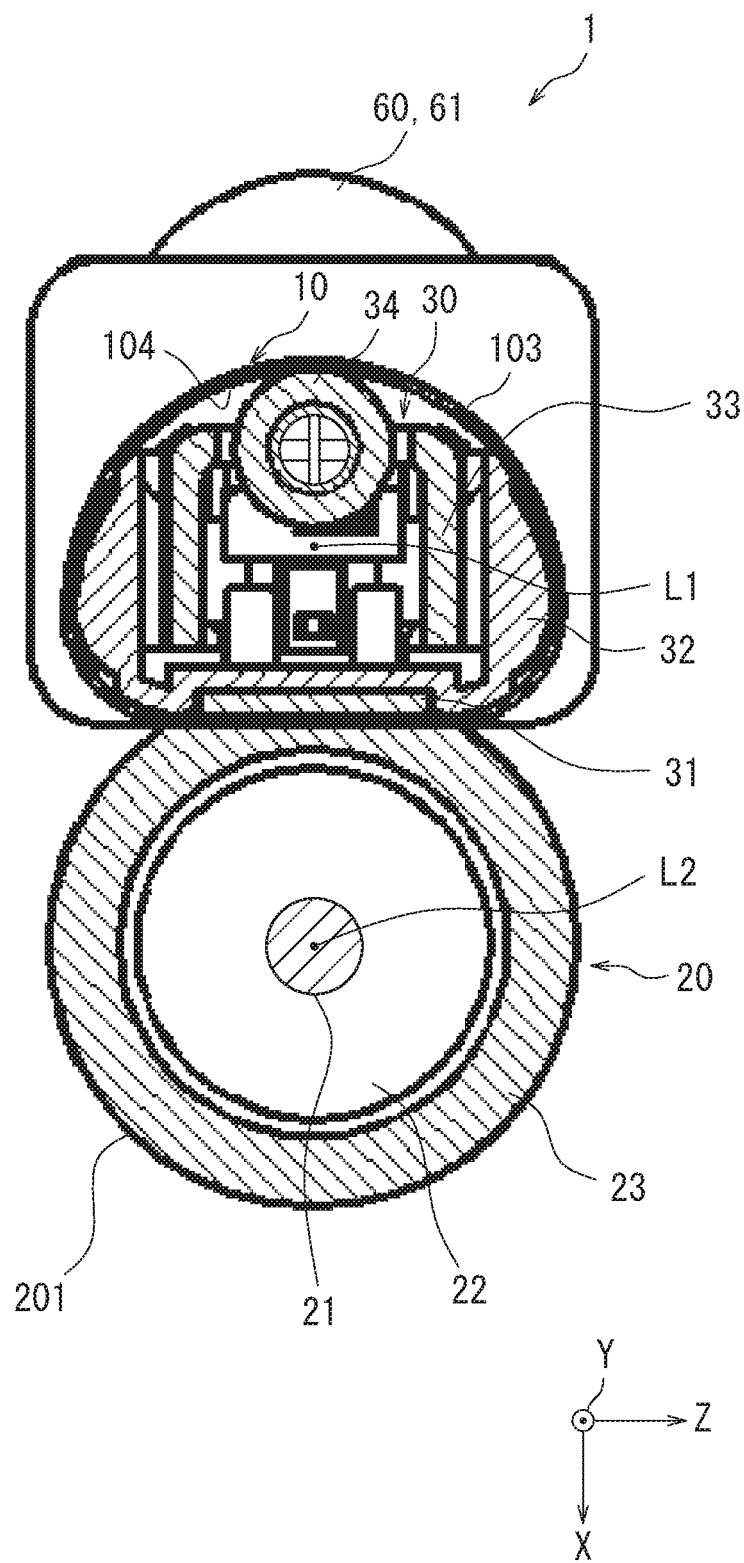
FIG. 3 is a sectional view of the fixing device taken along a line III-III of FIG. 2.

FIG. 3 is a sectional view of the fixing device 1 taken along a line III-III of FIG. 2. Note that some elements inside the fixing belt 10 are omitted in FIG. 3 for easy understanding.

As illustrated in FIG. 3, the fixing belt 10 further has an inner circumferential surface 104. The inner circumferential surface 104 of the fixing belt 10 faces the heating section 30. In other words, the heating section 30 is located inside the fixing belt 10. The heating section 30 includes a heater 31, a heater holding member 32, a reinforcing member 33, and a rotor 34.

The heater 31 heats the fixing belt 10. The heater 31 extends along the first rotational axis L1. Examples of the heater 31 include a surface heater and a long thin plate heater. The heater 31 is for example a ceramic heater and includes a ceramic substrate and a resistance heating element. The heater 31 is for example 1 mm in thickness. The heater 31 receives pressure from the pressure member 20 through the fixing belt 10. The heater 31 receives pressure from the reinforcing member 33 through the heater holding member 32.

The heater holding member 32 holds the heater 31. The heater holding member 32 and the fixing belt 10 are located on opposite sides of the heater 31. The heater holding member 32 is located inside the fixing belt 10 on a side nearer the pressure member 20 than the first rotational axis L1. The heater holding member 32 is for example made from heat resistant resin. The heater holding member 32 extends along the first rotational axis L1. One of two ends of the heater holding member 32 in the direction of the first rotational axis L1 is allowed to engage with for example a connector located at a main body of the image forming apparatus 100.

The reinforcing member 33 reinforces the heater holding member 32. The reinforcing member 33 is for example a long thin metal frame stay member. The reinforcing member 33 extends along the first rotational axis L1. The reinforcing member 33 has a substantially inverted-U shape in a sectional view in a direction of the first rotational axis L1. The reinforcing member 33 faces the heater holding member 32. The reinforcing member 33 and the heater 31 are located on opposite sides of the heater holding member 32. The heater holding member 32 is held by the belt holding member 60.

The rotor 34 rotates on the Y axis as a rotational axis center. The rotor 34 faces the inner circumferential surface 104 of the fixing belt 10. Part of the rotor 34 protrudes from the reinforcing member 33 to a negative side of the X axis. The part of the rotor 34 protruding from the reinforcing member 33 is in contact with the inner circumferential surface 104 of the fixing belt 10.

Figure 4:
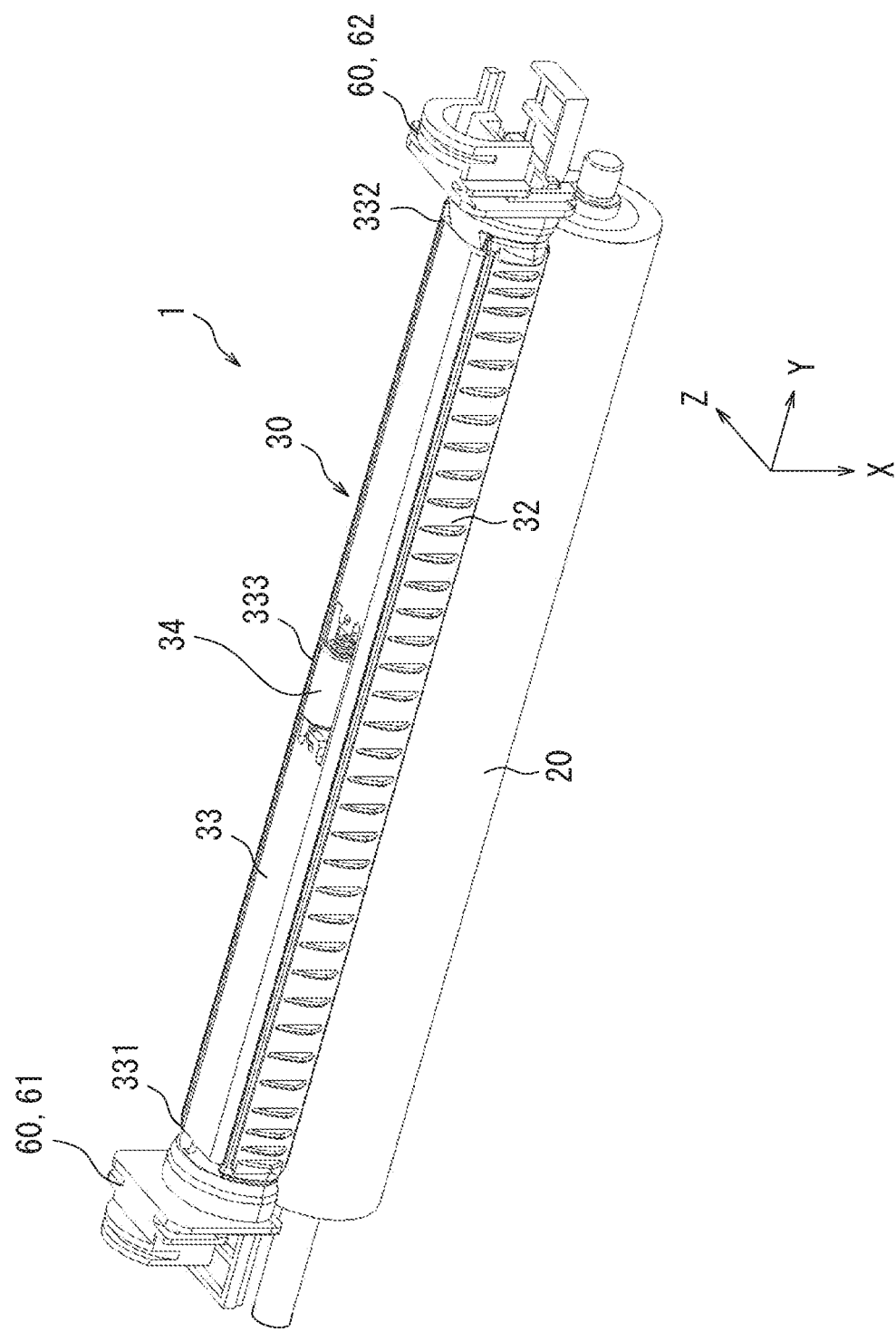
FIG. 4 is a perspective view of the fixing device illustrated in FIG. 2 with a fixing belt thereof omitted.

Next, the reinforcing member 33 in the present embodiment will further be described with reference to FIGS. 4 to 5. FIG. 4 is a perspective view of the fixing device 1 illustrated in FIG. 2 with the fixing belt 10 omitted.

As illustrated in FIG. 4, the reinforcing member 33 in the present embodiment includes a first end 331, a second end 332, and a central portion 333. The first and second ends 331 and 332 of the reinforcing member 33 are opposite ends of the reinforcing member 33 in a longitudinal direction thereof. The longitudinal direction of the reinforcing member 33 corresponds to a Y-axis direction. The first end 331 is an end of the reinforcing member 33 on the side of the first holding member 61. The second end 332 is an end of the reinforcing member 33 on the side of the second holding member 62. The central portion 333 is a central portion of the reinforcing member 33 in the longitudinal direction thereof. The central portion 333 faces the central portion 10c of the fixing belt 10 described with reference to FIG. 2.

The first holding member 61 engages with the first end 331 of the reinforcing member 33. The second holding member 62 engages with the second end 332 of the reinforcing member 33. One rotor 34 is attached to the central portion 333 of the reinforcing member 33.

Figure 5:
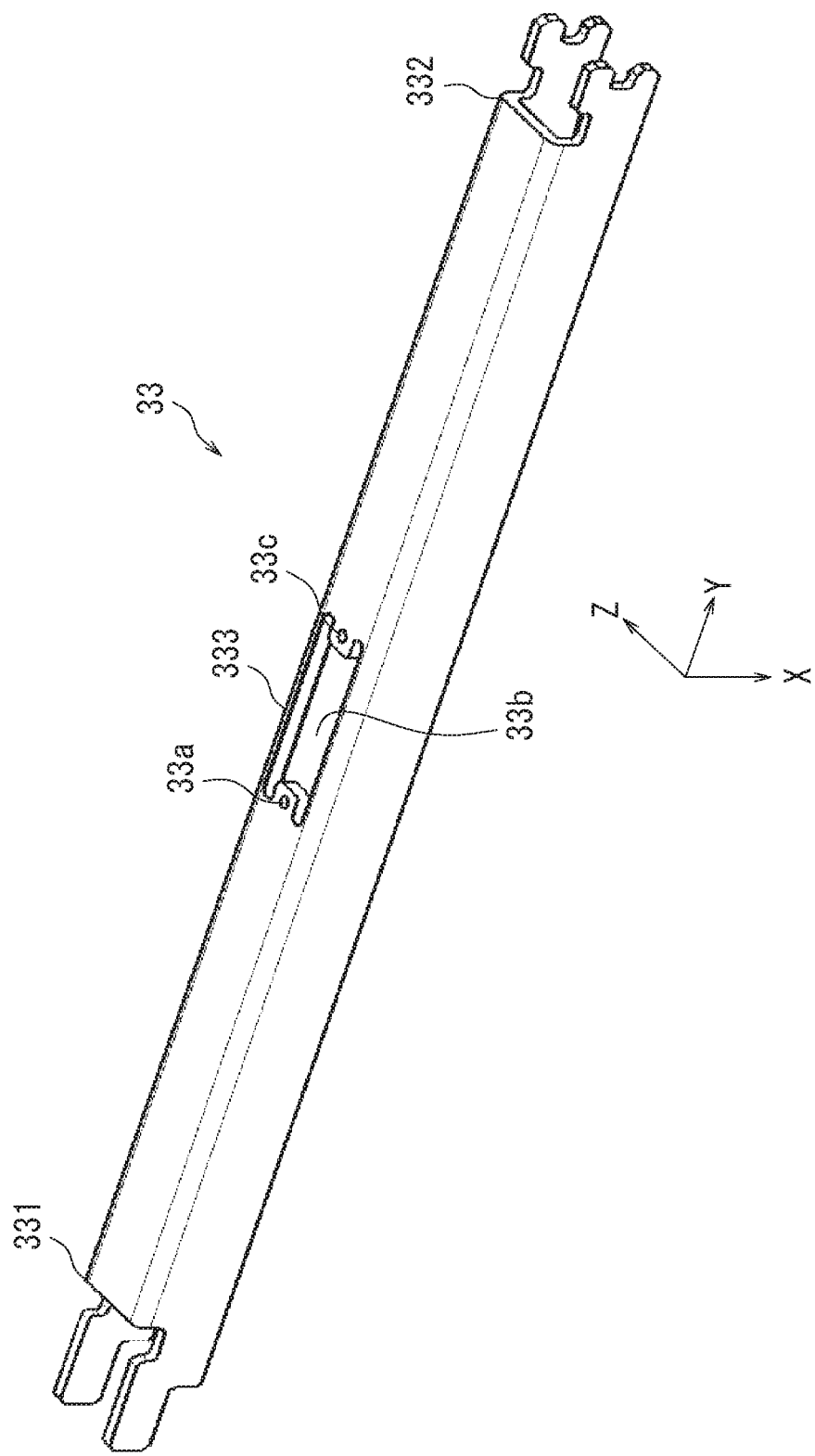
FIG. 5 is a perspective view of the reinforcing member in the embodiment of the present disclosure.

FIG. 5 is a perspective view of the reinforcing member 33 in the present embodiment. As illustrated in FIG. 5, the reinforcing member 33 has a first support hole 33a, a placement hole 33b, and a second support hole 33c. The reinforcing member 33 is provided with, in the central portion 333, the first support hole 33a, the placement hole 33b, and the second support hole 33c.

Figure 6A:
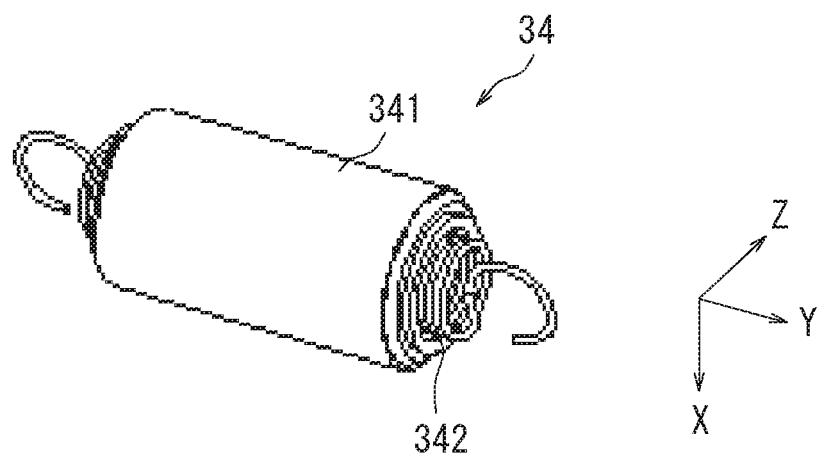
FIG. 6A is a perspective view of a rotor in the embodiment of the present disclosure.

Next, the rotor 34 in the present embodiment will further be described with reference to FIG. 6A to 6C. FIG. 6A is a perspective view of the rotor 34 in the present embodiment. As illustrated in FIG. 6A, the rotor 34 includes a main body 341 and a support member 342.

Figure 6B:
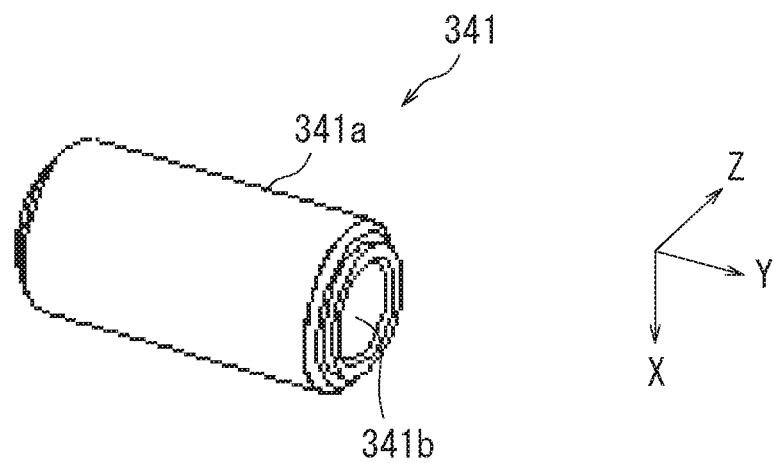
FIG. 6B is a perspective view of a main body in the embodiment of the present disclosure.

FIG. 6B is a perspective view of the main body 341 in the present embodiment. As illustrated in FIG. 6B, the main body 341 has a cylindrical shape with open ends. The main body 341 has an outer circumferential surface 341a and an inner circumferential surface 341b. The outer circumferential surface 341a of the main body 341 is in contact with the inner circumferential surface 104 of the fixing belt 10 described with FIG. 3. The main body 341 is placed inside the placement hole 33b described with reference to FIG. 5.

Figure 6C:
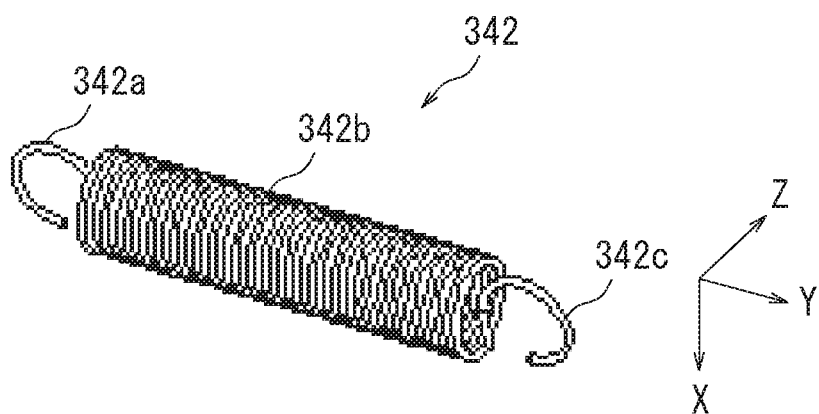
FIG. 6C is a perspective view of a support member in the embodiment of the present disclosure.

FIG. 6C is a perspective view of the support member 342 in the present embodiment. As illustrated in FIG. 6C, the support member 342 is an elastic member. The support member 342 is for example a cylindrical coil spring. The support member 342 is for example a tension spring. The support member 342 has a first end 342a, a stored portion 342b, and a second end 342c. One end of the stored portion 342b is connected to the first end 342a. The other end of the stored portion 342b is connected to the second end 342c.

The stored portion 342b is stored in the main body 341. Specifically, the stored portion 342b of the support member 342 is stored in the main body 341 with the first and second ends 342a and 342c protruding from opposite ends of the main body 341.

The reinforcing member 33 supports the first and second ends 342a and 342c of the support member 342. Specifically, the first end 342a of the support member 342 is engaged with the first support hole 33a described with reference to FIG. 5. The second end 342c of the support member 342 is engaged with the second support hole 33c described with reference to FIG. 5. The support member 342 is elastically deformed according to an external force. When receiving for example an external force in a positive X-axis direction, the support member 342 is elastically deformed to the positive side of the X axis.

As described with reference to FIG. 6B, the outer circumferential surface 341a of the main body 341 is in contact with the inner circumferential surface 104 of the fixing belt 10. Therefore, when the fixing belt 10 rotates, the rotor 34 rotates around the support member 342 as a rotational axis center.

As described with reference to FIGS. 3 to 6C, the outer circumferential surface 341a of the rotor 34 is in contact with the inner circumferential surface 104 of the fixing belt 10. The outer circumferential surface 341a of the rotor 34 receives, from the inner circumferential surface 104 of the fixing belt 10, an external force to the positive side of the Z axis. As a result, the support member 342 is elastically deformed to the positive side of the X axis, and the rotor 34 urges the central portion 10c of the fixing belt 10 from a side of the inner circumferential surface 104 to the negative side of the X axis.

The rotor 34 urges the fixing belt 10, thus preventing the fixing belt 10 from easily bending. The central portion 10c of the fixing belt 10 is hardly bent, thus preventing the outer circumferential surface 103 of the fixing belt 10 from easily being wrinkled. The outer circumferential surface 103 of the fixing belt 10 is hardly wrinkled, thus reducing possible image defects.

The rotor 34 is attached to the central portion 333 of the reinforcing member 33. This enables the rotor 34 to eliminate bending of the central portion 10c of the fixing belt 10, which is most likely to bend.

Only one rotor 34 is attached to the reinforcing member 33. In addition, the support member 342 is an inexpensive cylindrical coil spring. This lets production cost of the fixing device 1 to hardly increase.

The support member 342 is an elastic member. This enables the rotor 34 to keep urging the fixing belt 10 according to a shape change of the fixing belt 10 even when the fixing belt 10 is variable in shape.

As above, the embodiment of the present disclosure has been described with reference to FIGS. 1 to 6C. However, the present disclosure is not limited to the above-described embodiment and can be practiced in various ways within the scope without departing from the essence of the present disclosure (for example, (1) to (3) below). The drawings mainly illustrate schematic constituent elements in order to facilitate understanding of the disclosure, and thickness, length, numbers or the like of constituent elements illustrated in the drawings may differ from actual ones thereof in order to facilitate preparation of the drawings. Further, the material, shape, or dimensions of each constituent element described in the above embodiment is merely an example that does not impose any particular limitations and may be altered in various ways as long as such alterations do not substantially deviate from the effects of the present disclosure.

(1) Although the image forming apparatus 100 according to the embodiment of the present disclosure is a monochrome multifunction peripheral as described with reference to FIGS. 1 to 6C, the present disclosure is not limited to this. For example, the image forming apparatus 100 may be a monochrome printer. Alternatively, the image forming apparatus 100 may be a color multifunction peripheral or a color printer.

(2) Although the heating section 30 includes one rotor 34 in the embodiment of the present disclosure, the present disclosure is not limited to this. The heating section 30 needs to include at least one rotor 34 in the longitudinal direction thereof. Specifically, three or five rotors 34 may be attached to the reinforcing member 33. In this case, the rotors 34 are arranged in the longitudinal direction of the reinforcing member 33 in a symmetrical manner about the central portion 333 of the reinforcing member 33.

(3) Although the rotor 34 is attached to the central portion 333 of the reinforcing member 33 in the embodiment of the present disclosure, the present disclosure is not limited to this. Even in the case where a location, in the reinforcing member 33, of the rotor 34 is out of the central portion 333, the rotor 34 can urge the fixing belt 10.

What is claimed is:

1. A fixing device comprising:
    a fixing belt; and
    a heating section that faces an inner circumferential surface of the fixing belt, wherein
    the heating section includes:
        a heater configured to heat the fixing belt;
        a heater holding member that holds the heater;
        a reinforcing member that reinforces the heater holding member; and
        at least one rotor that faces the inner circumferential surface,
    the at least one rotor includes a main body and an elastic member,
    the main body has a cylindrical shape with open ends,
    the elastic member includes:
        a stored portion that is stored in the main body; and
        opposite ends that respectively protrude from opposite ends of the main body with the stored portion stored in the main body,
    the at least one rotor is attached to the reinforcing member, and
    the reinforcing member supports the opposite ends of the elastic member.

2. The fixing device according to claim 1, wherein
    the at least one rotor is attached to a central portion, in a longitudinal direction, of the reinforcing member.

3. The fixing device according to claim 1, wherein the at least one rotor is one rotor.

4. The fixing device according to claim 1, wherein the elastic member is a coil spring.

5. An image forming apparatus comprising a fixing device according to claim 1, and an image forming section configured to form a toner image on a recording medium, wherein the fixing device fixes the toner image to the recording medium.

* * * * *